United States Patent [19]

Hieronymus et al.

[11] 4,076,046

[45] Feb. 28, 1978

[54] FAST ACTING TWO-WAY VALVE

[75] Inventors: Gerald Whitfield Hieronymus, Lexington; Michael Lynn Sendelweck, Georgetown; James Everett West; Joe William Woods, both of Lexington, all of Ky.

[73] Assignee: International Business Machines Corporation, Armonk, N.Y.

[21] Appl. No.: 691,648

[22] Filed: Jun. 1, 1976

[51] Int. Cl.$^2$ .............................................. F16K 11/16

[52] U.S. Cl. ............................ 137/627.5; 137/596.17; 251/138

[58] Field of Search ............... 91/457; 137/85, 596.16, 137/596.17, 627.5; 251/138

[56] References Cited

U.S. PATENT DOCUMENTS

| | | | |
|---|---|---|---|
| 3,112,769 | 12/1963 | Broadwell | 137/596.17 X |
| 3,181,854 | 5/1965 | Backlund | 137/627.5 |
| 3,216,440 | 11/1965 | Kohman | 137/596.17 |

FOREIGN PATENT DOCUMENTS

| | | | |
|---|---|---|---|
| 216,653 | 3/1958 | Australia | 137/627.5 |
| 924,731 | 5/1963 | United Kingdom | 137/627.5 |

*Primary Examiner*—Robert G. Nilson
*Attorney, Agent, or Firm*—Kenneth W. Hairston; Maurice H. Klitzman

[57] ABSTRACT

A valve assembly having a small volume cavity formed therein which communicates with two valves, one of which is closed completely before the other one is opened and vice versa. An actuating mechanism holds a valving member in one of the valves in an opened condition to thereby maintain a fluidic path through the one valve and the cavity. The other valving member at this time lies in a closed position preventing communication between this valve and the cavity. The actuating mechanism when actuated moves away from the valving member in the open valve allowing the open valve to close completely. The fluidic path through the one valve is thereby broken. A second fluidic path is made when the actuating mechanism moves the other valving member to an opened position.

3 Claims, 5 Drawing Figures

FIG. 3
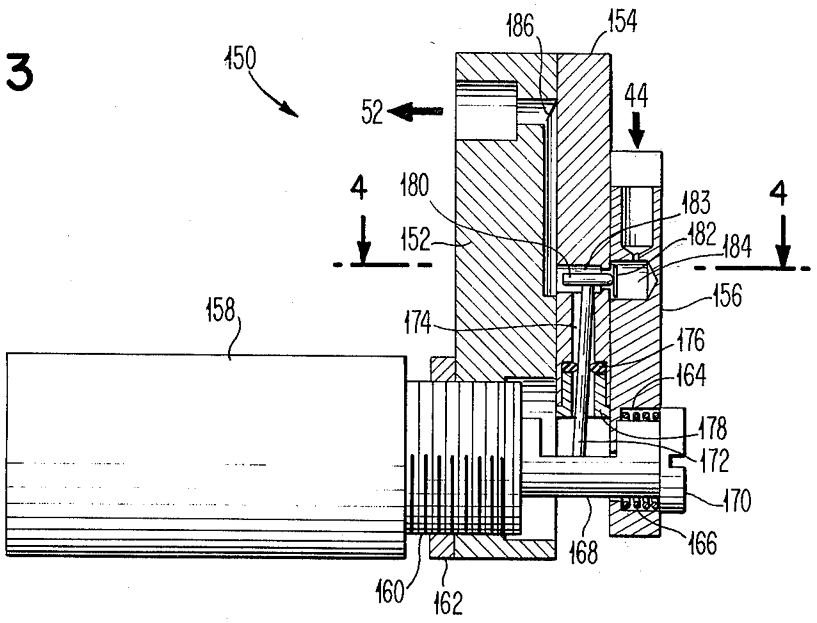
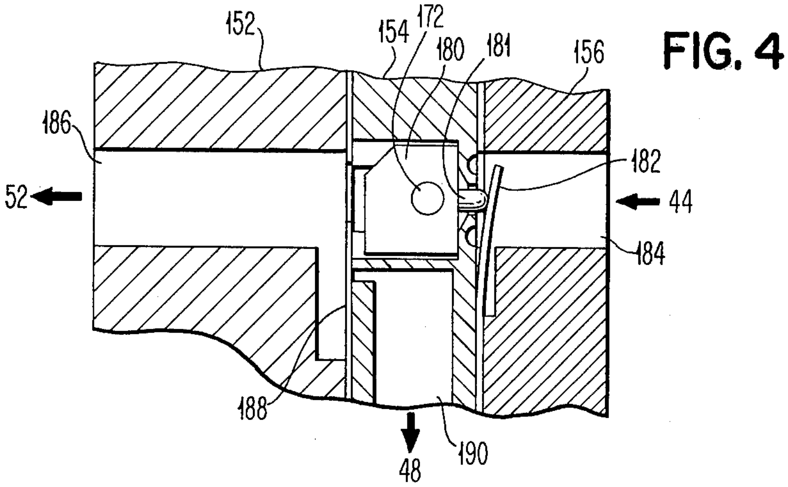
FIG. 4
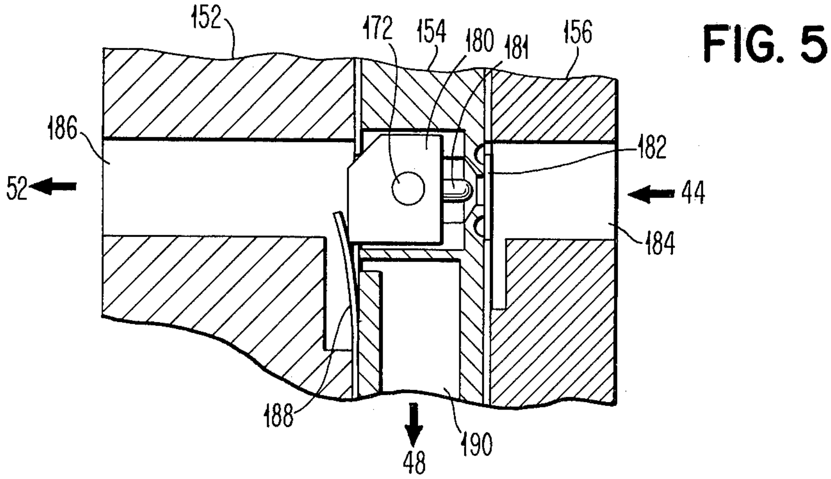
FIG. 5

FAST ACTING TWO-WAY VALVE

BACKGROUND OF THE INVENTION

1. Description of the Invention

This invention relates to valves, and more particularly, to a valve containing one or more flow lines with a power driven actuator arranged relative to the flow lines within the valve to determine the order, duration or magnitude of flow through each of the several lines.

2. Prior Art

The valve and associated hardware in an ink recirculating system for ink jet printing apparatus is very small. Therefore the operating capacity of the valve and the other associated hardware is limited. The pump used to control the flow around the whole circulating system operates at a pressure sufficient to force the ink through the head and onto the medium to be printed or to gutter without splatter and wetting of other parts in the ink jet printing apparatus. Typical valves for use with this pump in an ink recirculating system inherently have both the inlet valve and the vent valve opened simultaneously during minute periods of operation, even though there is an effort to minimize this. When both of the valves are opened simultaneously over a period of operating time, the pressure already built up in the system is gradually lost. This results in the pump having a tendency to over exceed its pumping capacity and the pressure becoming insufficient to force the ink stream to the gutter without contamination of other parts of the printing apparatus. This leads to a shutdown in the ink recirculating system and/or damage to the pump itself.

Another valve is known which purports to open one port simultaneously with the closing of another port. Although this substantially occurs, there is a small period of time when both are open. In this valve, the two ports are located directly opposite each other with a valve closing member located between the two ports. In normal operation, the valve closing member is located adjacent one of the two ports, such that when the valve closing member is actuated, it leaves the first port and moves very quickly to the other port and closes it. There is a small period of time when both ports are opened simultaneously, namely, when the valve closing member is traveling to the other port. This valve if used in a high pressure ink recirculating system would cause a gradual loss of pressure and the pump would start rattling and it would have a tendency to over exceed its pump rate.

Another problem with this particular valve when used in a high pressure system is that it can contaminate other associated hardware in the recirculating sytem due to the small period of time when both ports are opened simultaneously. If the opened port through which the fluid is entering the valve has to wait until the valve closing member translates the distance between the two ports to be closed, the flow of fluid through it will continue and this fluid can enter the other now opened port or continue through the flow lines to the outside where it can dribble onto other associated hardware.

Although I have described pressure loss and other problems that occur in high-pressure small volume systems and valves, it should be understood that these same problems can occur in high-pressure large volume systems and valves. The elimination of these problems would be a desirable effect in both systems.

OBJECTS OF THE INVENTION

It is an object of this invention to eliminate pressure loss through a valve during stream start up and shut down in an ink jet recirculating system.

It is another object of this invention to permit rapid starting and stopping of an ink stream through a valve and keep to a minimum contamination of hardware adjacent to the valve in an ink jet printing apparatus.

It is still another object of this invention to enable a rapid rise and drop in pressure in the valve in an improved manner.

SUMMARY OF THE INVENTION

The above objects are accomplished through the use of a valve assembly with a small interior volume cavity formed therein which communicates with two valves, one of which is completely closed before the other one is opened and vice versa.

An actuator, located adjacent the two valves, when actuated moves in a lost motion manner away from the valving member in the opened valve to allow the valving member to close this valve completely before continuing its lost-motion movement to the other valve where it picks up the load weight of the other valving member and forces it to an opened position. When the now opened valve is desired to be closed, the actuator moves away from the opened valve thereby allowing it to close completely before opening the other valve. The operation of the actuator, relative to the two valves, can therefore be described as a break-before-make switching operation because an open condition of one valve is broken or closed completely before the other valve is made or opened.

The foregoing and other objects, features and advantages of the invention will be apparent from the following, more particular description of the preferred embodiment of the invention, as illustrated in the accompanying drawings.

BRIEF DESCRIPTION OF THE DRAWINGS

FIG. 3 shows an alternate design of the valve, with the inlet and vent valves located adjacent to each other.

FIG. 4 is a top view of the valve of FIG. 3, taken through line 4—4, depicting the inlet valve open and the vent valve closed.

FIG. 5 is a top view of the valve of FIG. 3, taken through lines 4—4, depicting the inlet valve closed and the vent valve opened.

DESCRIPTION OF THE PREFERRED EMBODIMENT

Figure 1:
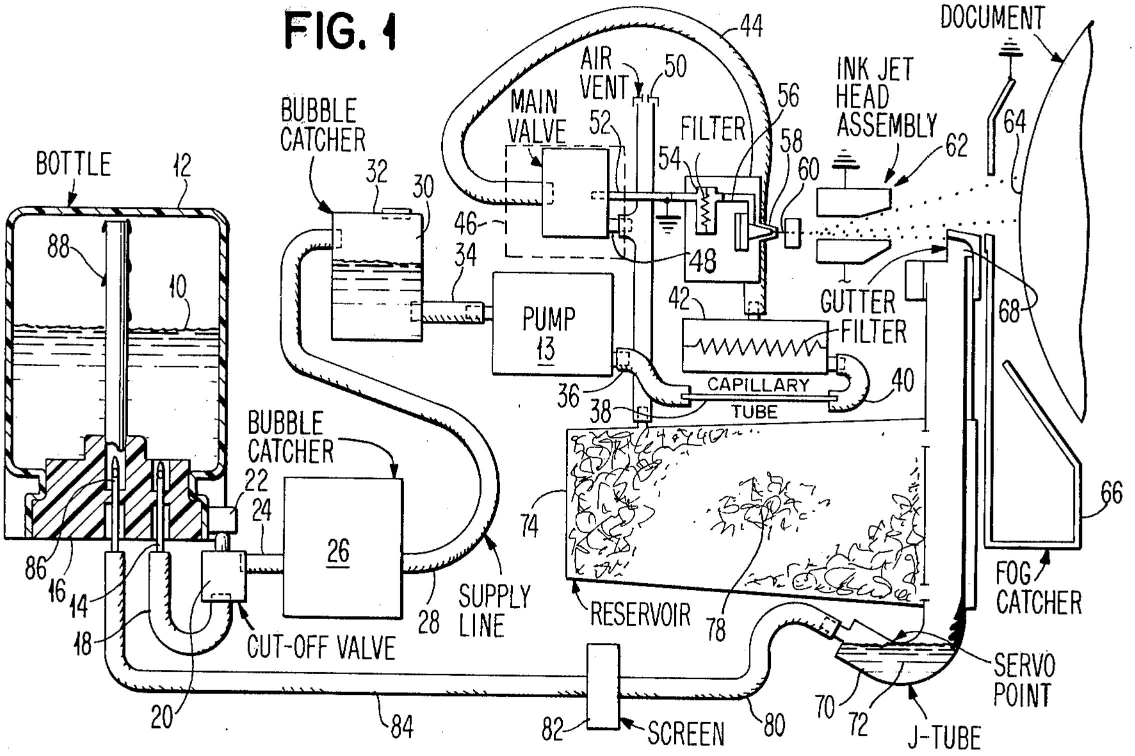
FIG. 1 is a diagram of an ink recirculating system for ink jet printing operations.

Referring to FIG. 1, there is shown an ink recirculating system in which the valve of this application could be used. This particular ink recirculating system is described, generally, in U.S. Pat. No. 3,929,071, Ser. No. 535,774, filed Dec. 23, 1974, and entitled "Ink Recirculating System for Ink Jet Printing Apparatus," by David R. Cialone, et al. which is assigned to the same assignee as the present invention. Even though this particular valve is shown in an ink recirculating and printing environment, it should be understood that this valve could be used for other similar valving purposes.

In FIG. 1, ink 10 leaves ink bottle 12 under the influence of a drawing action created by pump 13. Ink 10 leaves bottle 12 through a needle 14 inserted into stopper 16 located at the lower end of bottle 12. A line 18 connects needle 14 with a cut-off valve 20 which stops the flow of ink 10 when bottle 12 is removed from the system. Projection 22, located on the lower outer lip of bottle 12, activates and deactivates cut-off valve 20 whenever bottle 12 is inserted into or removed from the system. A line 24 connects cut-off valve 20 with a bubble catcher 26 which removes bubbles entrapped or in solution with circulating ink 10. If bubbles continue through the circulating system, and enters pump 13, its pumping efficiency will be reduced. A supply line 28 connects bubble catcher 26 with the upper chamber 30 of another bubble catcher 32 for removing bubbles not picked up by the preceding bubble catcher 26. From this bubble catcher 32, ink 10 flows through line 34 to pump 13 where it continues through line 36 to capillary tube 38, line 40 and filter 42. The combination of capillary tube 38 and filter 42 acts as an acoustical filter which damps out 60 cycle pressure perturbations in the pump pressure due to the pump's inherent operating nature. Filter 42 not only acts as an acoustical filter, but also doubles as a particle filter for ink 10 passing through the system.

From this point ink 10 travels through line 44 to main valve 46 which turns the ink flow through the system on and off. A line 48 connects valve 46 with air vent 50 for the purpose of venting the system to the atmosphere. From valve 46, ink 10 continues its circulation through line 52 which is connected to a final filter 54 before traveling through conduit 56 to nozzle 58.

Ink drops 60 are emitted from nozzle 58 and travel through an assembly 62 comprised of electrodes which charge and deflect them in their path of travel to a document 64 for a printing operation. A fog catcher 66 catches ink mist which falls or bounces off document 64. Any excess ink drops 60 not needed for printing, travel to gutter 68 where they flow down J-tube 70 to form a pool 72 of ink. A reservoir 75 is connected to J-tube 72 by two small openings 76, with one at the top and one at the bottom of reservoir 74. A foam material 78 is packed inside reservoir 74 to keep excess ink 10 from sloshing around and thus flowing back out of gutter 68. The excess ink 10 in reservoir 74 is accumulated during the period of vacuum buildup in bottle 12. The recirculating system in the absence of a vacuum cannot pull ink 10 in reservoir 74 and J-tube 70 back into bottle 12.

After a vacuum in the system has built up to a certain level, ink 10 is drawn through J-tube 70 through line 80 to a final screen or filtering element 82, and then to line 84, return needle 86 in stopper 16, and then through standpipe 88 which extends upwardly almost to the top of bottle 12. Thus returned ink 10 is then ready for another circulating and printing operation.

Figure 2:
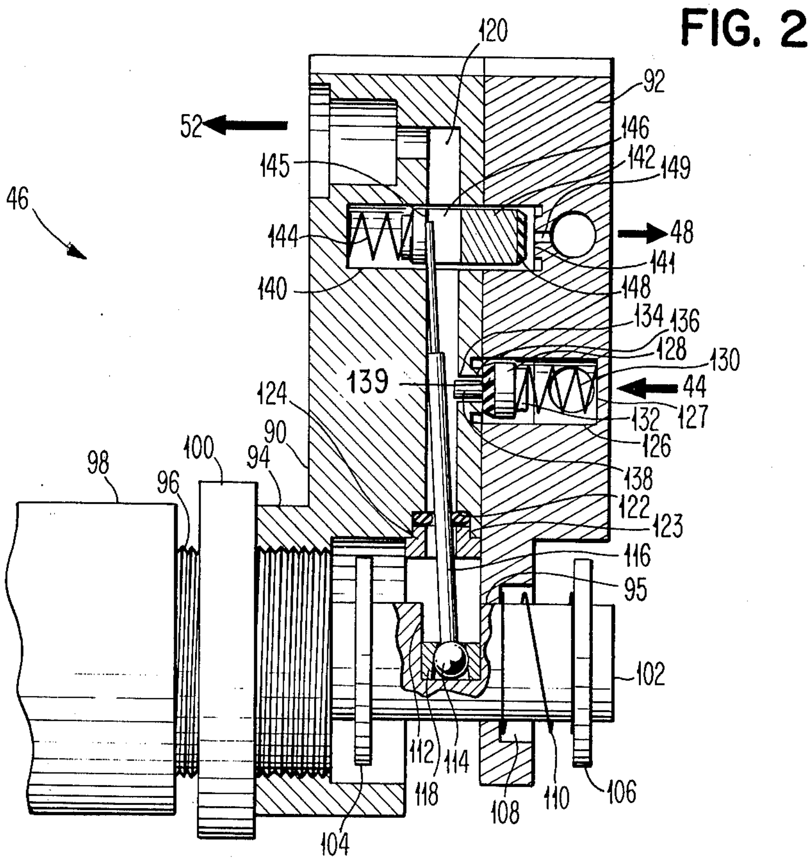
FIG. 2 is an axial section of a preferred form of valve in accordance with the invention, showing the valves in an inlet valve closed and vent valve opened condition.

Referring to FIG. 2, there is shown a valve indicated generally by the numeral 46 in accordance with this invention which is particularly adapted to be used in an ink recirculating system shown in FIG. 1. However, it will be understood that the utility of valve 46 is not limited to that particular embodiment or use, and that the drawing merely illustrates a preferred embodiment of a valve for use in FIG. 1.

The preferred valve embodiment illustrated includes valve body sections 90 and 92 which are attached by screws (screws not shown) to form the body of valve 46. Valve 46 has to be very small because of the environment it is used in. The width of valve 46 is about ⅝ of an inch and its height is approximately 1.3 inches. The fluid volume of valve 46 is approximately 3 thousandths of a cubic inch. Valve body section 90 includes an internally threaded perpendicular leg 94 at its lower end, for receiving a threaded extension 96 of a solenoid 98. A jam nut 100 is threadably mounted on threaded portion 96 for the purpose of tightening solenoid 98 to leg 94 of valve body section 90. Solenoid 98 includes a plunger 102 which moves back and forth upon activation and deactivation respectively of solenoid 98. Two C-clips 104 and 106 are mounted on the outer periphery of plunger 102 and C-clip 104 forms a stop for plunger 102 after activation.

Valve body section 92 contains at its lower outer edge thereof, a hole 95 through which plunger 102 passes and a recessed portion 108 which acts as a seat for a spring 110 mounted around plunger 102. The outer end of spring 110 rests against C-clip 106. A recessed area 112 is cut into the upper face of plunger 102 for receiving the bulb or ball 114 of an actuator rod 116. A socket 118 is placed inside recess portion 112 for the purpose of forming a ball and socket joint between actuator rod 116 and plunger 102.

Actuator rod 116 extends upwardly into a cavity 120 formed inside valve body section 90. This cavity 120 is sealed at the lower end of valve body section 90 by placing an O-ring 122 in indentation 123 formed on the inner lip of valve body section 90 around the outer periphery of actuator rod 116. It is noted that O-ring 122, actuator rod 116 and other parts within the valve 46 are chosen for their anticorrosive properties because of their use in an ink environment. O-ring 122 is held in place by a retainer 124 which is attached to valve body section 90 by screws which are not shown.

A recess 126 is provided in valve body section 92 to form an inlet valve 127. This recess 126 lies perpendicular to the length of cavity 120. In FIG. 1, it can be seen that line 44 enters valve 46 through this inlet. A valve member 128 is slidably disposed in recess 126 by a spring 130 that rests against the rear wall of recess 126 in valve body piece 92. The other end of spring 130 rests on a seat 132 formed on valve member 128. The vaves in pump 13 in FIG. 1 aren't leak proof and a situation could occur where ink 10 could be sucked back through valve 46 and pump 13 if a check valve was not used. By sizing inlet valve spring 130 properly, so that the force it imparts to valve member 128 is greater than the backwards sucking pressure mentioned, this problem can be eliminated. The check valve created has the added advantage of preventing the sucking of air back through nozzle 58. The inlet valve 127 has a mortise 134 formed in valve body section 90 which communicates with cavity 120. The innerside of the wall surrounding mortise 134 serves as a seat 136 for valve member 128. An extension or tenon 138 on the face of valve member 128 extends through mortise 134 into cavity 120.

A recess 140 is formed in body sections 90 and 92 to provide a vent valve 141 above inlet valve 127. This recess 140 is perpendicular to cavity 120. The arrow 48 in FIG. 2 corresponds to line 48 in FIG. 1 which leaves vent valve 141 going to air vent 50. A valve member 142 is slidably disposed within vent valve 141 on a spring 144 which rests against the rear wall of valve body section 90. A slot 146, extends through the center of valve member 142 to serve as a passageway for ink 10 as in FIG. 1 or some other similar fluid to flow through to other associated hardware. The upper portion of actuator rod 116 also extends a partial distance through this slot 146 in valve member 142. A soft silicone rubber or some other flexible seat 148 is bonded to valve member 142 at an end away from spring 144 to serve as an elastic stopper for vent valve 141 when valve member 142 rests against opening 149. A flexible seat 139 is also bonded to valve member 128. The line 52 in Figure, is shown to denote liquid leaving valve 46 after its passes through cavity 120.

FIGS. 3, 4 and 5 illustrate another embodiment of the valve disclosed in FIG. 2. In FIG. 3, the valve, illustrated generally by the numeral 150, differs from valve 46 shown in FIG. 2 in that the inlet valve and the vent valve are juxaposed at a 90° angle. This angle created by inlet and vent valves 184 and 190, respectively, can be seen in FIGS. 4 and 5.

In this valve 150, the valve body is comprised of valve sections 152, 154 and 156 which are connected by screws (screws not shown). A solenoid 158 is connected to valve section 152 by a screw threaded extension 160 and then tightened by lock nut 162. Valve section 156 contains a recess 164 for holding a spring 166 which acts as a return spring for plunger 168 when solenoid 158 is deactivated. An end-cap 170 on plunger 168 acts as a retainer for spring 166. A C-clip (not shown) mounted around plunger 168 forms a stop for plunger 168 after activation. Actuator rod 172 extends into cavity 174 which lies at the lower end of valve section 154. This cavity 174 is sealed by an O-ring 176 and a retainer 178 placed around actuator rod 172.

At the upper end of actuator rod 172, there is a head 180 with a projection 181 facing inlet valve 184. A thin and flexible stainless steel reed member 182 serves as a valving member for inlet valve 184. This reed member 182 cuts off communication between inlet valve 184 and a chamber 183 located at the upper end of cavity 174. A reed member 188 lying directly opposite reed member 182 serves as a valving member for vent valve 190. In FIGS. 3, 4 and 5, inlet valve 44, vent valve 48 and outlet 52 correspond to the same valves and outlet shown in FIG. 1.

STATEMENT OF THE OPERATION

As can be seen in FIG. 2, inlet valve 127 is closed because valve member 128 is resting against seat 136 which leads through cavity 120. The vent valve 141 is opened because actuator rod 116 has pushed vent valve member 142 and seat 148 away from opening 149 in valve section 92 which leads to vent line 48. By closing vent valve 141 completely before opening inlet valve 127 and vice versa, the objects of this invention, as stated above, are realized.

In operation, solenoid 98 is activated and a magnetic field is up which draws plunger 102 towards it against the action of return spring 110. The movement of plunger 102 and ball 114 (a ball and socket joint) has the effect of moving the upper part of actuator rod 116 in the opposite direction. A pivot point for actuator rod 116 is created by O-ring 122 which has a primary purpose of sealing cavity 120 from other apparatus in valve 46 such as solenoid 98 and plunger 102.

When the upper part of actuator rod 116 is swung in this opposite direction, valve member 142 is pushed against opening 149 in valve section 92 under the action of spring 144, therefore closing vent valve 141. The actuator rod 116 then moves away from sidewall 145 in valve member 142 through slot 146 placed therethrough. The travel of actuator rod 116 away from valve member 142 can be described as lost-motion movement.

After vent valve 141 is closed, actuator rod 116, still traveling in the specified direction, comes into contact with tenon 138 on inlet valve member 128 which extends through mortise 134 in valve piece 94. Actuator rod 116 then moves valve member 128 off seat 136 against the action of spring 130 thereby opening inlet valve 127. A fluidic path is now established whereby ink 10 coming through oine 44 as seen in FIG. 1 can enter inlet valve 127, travel through cavity 120 and then through line 52 to some other location in FIG. 1. At this time, inlet valve 127 and cavity 120 are at a pressure of about 40 to 50 PSI which is the output pressure of pump 13 in FIG. 1. It should also be noted that the pressure in the circulating system is adequate to initiate the flow of ink 10 because of the small size of valve 46 and other hardware.

The forward motion of plunger 102 is stopped by C-clip 104 which comes to rest against a spacer (not shown) at the end of screw thread 96.

To reverse the operation and therefore open and close vent valve 141 and inlet valves 127, respectively, the power is taken off solenoid 98 which in turn cuts off the magnetic field holding plunger 102. Spring 110 acting against C-clip 106 pushes plunger 102 away from the body of solenoid 98. Actuator rod begins pivoting about O-ring 122, but this time in a reverse direction. An actuator rod 116 is pivoted in its lost-motion travel, it leaves tenon 138 to allow spring 130 to close inlet valve 127 by forcing valve member 128 against seat 136. Inlet valve 127 is now completely closed with pressure from pump 13 cut off. Actuator rod 116 continues its journey through slot 146 where it comes into contact with sidewall 145 in valve member 142 forcing this valve member 142 away from opening 149 against the action of spring 144. The pressure in valve 46 is then vented to the atmosphere through line 48 and air vent 50.

The quick closing of inlet valve 127 by valve member 128 and spring 130 and the almost simultaneous opening of vent valve 141 creates a rapid drop in nozzle pressure from 40–45 PSI to 0 PSI in approximately 1 millisecond. This prevents ink 10, as seen in FIG. 1 from continuing its journey through the circulating system to nozzle 58 where it could dribble out and contaminate other hardware. When vent value 141 is closed and inlet valve 127 is opened, the nozzle pressure will rise at the same rate. This occurs because no pressure is lost through vent valve 141.

The operation of the actuator, relative to the two valves, can therefore be described as a break-before-make switching operation because an open condition of one valve is broken or closed completely before the other valve is made or opened.

The operation of the valve shown in FIGS. 3, 4 and 5 is similar in operation to the valve shown in FIG. 2. In FIG. 3, solenoid 158 has already been energized and plunger 168 has pivoted actuator rod 172 about the pivot point created by O-ring 176. As can be seen in FIG. 4, head 180 and projection 181 are pressing against reed valve member 182 to open inlet valve 184 to form a fluidic path from line 44 through chamber 183 to passage 186 and then to line 52 for connection with other hardware.

To close inlet reed valve 182, solenoid 158 is deactivated and plunger 168 moves away from the body of solenoid 158 under the action of spring 166. Actuator rod 172 is pivoted in the opposite direction away from inlet reed valve member 182 allowing it to spring to a closed condition before continuing in its pivoting motion towards vent reed valve member 188. Vent valve 190 is opened when an edge of head 180 opposite projection 181 pushes vent reed valve member 188 off its seat. Valve 190 is then opened to the atmosphere through air vent line 48 in FIG. 1. Therefore, it can be seen that neither valve is opened while the other one is in an opened condition.

While the invention has been shown and described with reference to preferred embodiments thereof, it will be appreciated by those of skill in the art that variations in form may be made therein without departing from the spirit and scope of the invention.

What is claimed is:

1. A valve assembly comprising:
   a housing having a small volume cavity formed therein for communicating with two valves and an outlet;
   a valve member in each of said two valves to control communication between said two valves and said cavity;
   said valve members being normally biased by means in a closed position to prevent communication between said two valves and said cavity;
   one of said valve members extending across said cavity and having a slot therein substantially equal to the width of said cavity and the other of said valve members having a portion thereof extending into said cavity;
   actuating means extending through said cavity and passing adjacent said portion and extending into said slot for actuating said two valve members;
   sealing means within said housing surrounding said actuating means to seal said cavity to the atmosphere;
   solenoid means connected to said actuating means for providing pivoting motion to said actuating means;

said solenoid means normally conditioning said actuating means to hold one or the other of said valve members in an open condition;
   said solenoid means when in a deactivated state holds said actuating means against a sidewall of said slot in said one valve member to maintain the corresponding one of said valves in an open position and thereby establish a fluidic path through said one valve, said cavity and said outlet, with said other valve being in a closed position;
   said solenoid means upon activation pivoting said actuating means away from said sidewall in said slot allowing said one valve member to close completely and thereby break said fluidic path through said one valve, said cavity and said outlet;
   after said one valve is closed completely, said actuating means continuing its pivoting motion through said cavity contacts said other valve member to force said other valve member in the other of said valves to an open position to thereby make a fluidic path through said other valve, said cavity and said outlet;
   said one valve being completely closed before said other valve is opened preserving pressure in flow lines leading to said other valve.

2. The valve of claim 1 wherein said solenoid means upon deactivation moves back to its normal position, pivoting said actuating means;
   said actuating means in moving away from said other valve member breaks the fluidic path through said other valve completely before translating the distance of said cavity to said one valve member to push it to an open position and thereby make a fluidic path through said one valve.

3. The valve of claim 1 wherein said means used to normally bias said valve members in a closed position includes springs;
   said spring holding said other valve member in a closed position imparts sufficient pressure to said other valve member to prevent back flow through said other valve when in a closed condition.

* * * * *